March 10, 1953  H. B. VROOM  2,630,971

RESETTING MEANS FOR COUNTER MECHANISM

Filed Sept. 26, 1951  4 Sheets-Sheet 1

Inventor
HAROLD B. VROOM
By
Lindsey and Pretzman
Attorneys

March 10, 1953 H. B. VROOM 2,630,971
RESETTING MEANS FOR COUNTER MECHANISM
Filed Sept. 26, 1951 4 Sheets-Sheet 2

Inventor
HAROLD B. VROOM
By
Lindsey and Prutzman
Attorneys

March 10, 1953    H. B. VROOM    2,630,971
RESETTING MEANS FOR COUNTER MECHANISM
Filed Sept. 26, 1951    4 Sheets-Sheet 3

Inventor
HAROLD B. VROOM
By Lindsey and Prutzman
Attorneys

March 10, 1953 H. B. VROOM 2,630,971
RESETTING MEANS FOR COUNTER MECHANISM
Filed Sept. 26, 1951 4 Sheets-Sheet 4

Inventor
HAROLD B. VROOM
By
Lindsey and Prutzman
Attorneys

Patented Mar. 10, 1953

2,630,971

UNITED STATES PATENT OFFICE 2,630,971

RESETTING MEANS FOR COUNTER MECHANISM

Harold B. Vroom, Simsbury, Conn., assignor to Veeder-Root Incorporated, Hartford, Conn., a corporation of Connecticut Application September 26, 1951, Serial No. 248,319

19 Claims. (Cl. 235—144)

The present invention relates generally to registers and, more particularly, to registers having a resetting mechanism employing heart-shaped cams.

The apparatus of the present invention has particular utility in the gasoline dispensing field for registering or counting the output of the dispenser. It can be connected to the meter of the dispensing apparatus in the usual way and can be designed to register the output in terms of both the quantity and the cost of the liquid dispensed and in all other respects will accomplish the usual functions of conventional registers or counters now produced commercially for this purpose. At the same time it has many advantages over conventional registers or counters in that it is more compact and economical in design, it will operate more efficiently, and it will remain serviceable and accurate over long periods of use without the need for frequent repair or replacement.

A principal object of the invention is to adapt a heart-shaped cam type of resetting mechanism to a register or counter and at the same time avoid or eliminate the disadvantages normally encountered with mechanisms of this type. Included in this object is the provision of a novel combination of number wheel resetting means and means for unlocking the number wheels during resetting as well as the individual novel components of the combination which render the combination effective and efficient for the intended purpose.

Other objects will be in part obvious, and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings illustrating a specific embodiment of the present invention.

Figure 1:
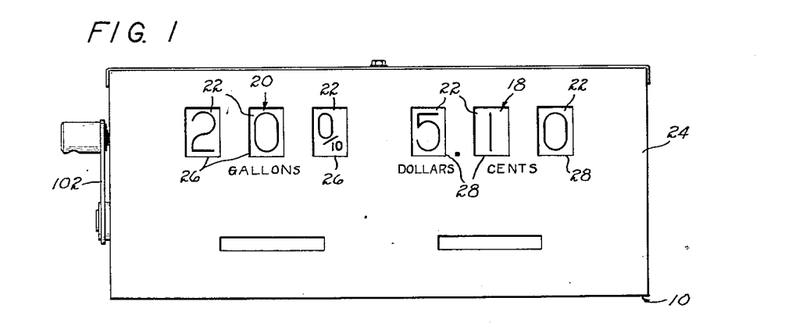
Figure 1 is a front elevational view of the register or counter with the cover thereof in place.
Figure 2:
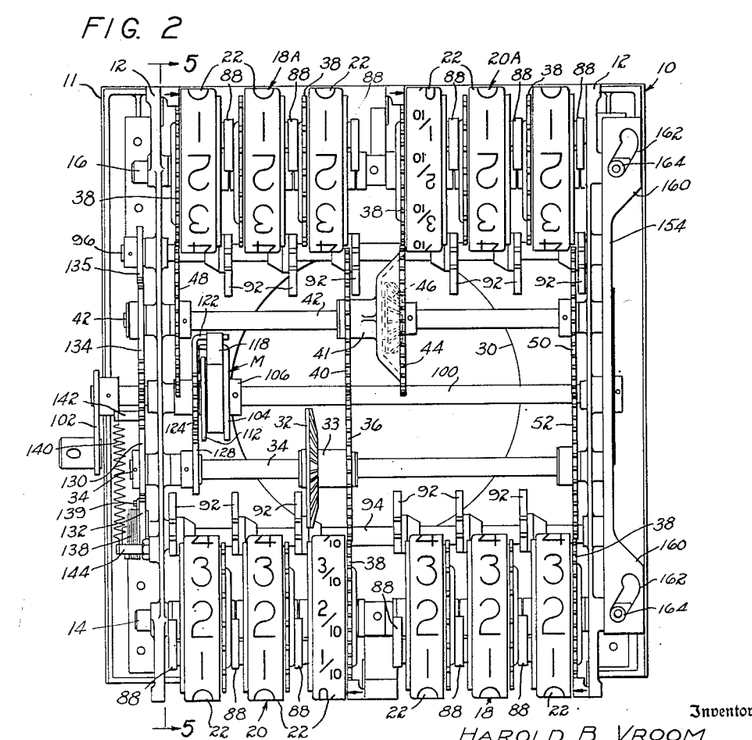
Fig. 2 is a top plan view of the register with the cover removed.

Referring to the drawings, and particularly Figures 1 and 2 thereof, the counter of the present invention is mounted in a frame 10 consisting of a generally rectangular plate 11 having adjacent each side margin an upstanding web 12 bolted to the edges of said plate 11. At the opposite ends of the frame are shafts 14 and 16 which extend between and are supported for axial movement in, the webs 12. Located on the shaft 14 in end-to-end or aligned position are two indicators 18 and 20, the indicator 18 being a cost indicator and the indicator 20 being a quantity indicator. Corresponding indicators 18A and 20A are mounted in similar fashion on shaft 16. Each indicator comprises a set of number wheels 22 with transfer means therebetween. It will be noted, particularly from Fig. 2, that the cost indicator and the quantity indicator at one end of the mechanism are respectively behind the quantity indicator and the cost indicator at the other end of the mechanism.

When installed in a dispensing apparatus, the registering mechanism may be housed in a cover 24 which is shown in Fig. 1. The cover is provided at each end with two windows 26 and 28 positioned in side-by-side relation so as to register with the respective quantity and cost indicators. Below these respective windows may appear the indicia "Gallons" and "Dollars and Cents," as shown in Fig. 1.

The quantity indicators 20 and 20A are adapted to be driven from a bevel gear (not shown) which may be connected to the shaft of a meter of a dispensing pump or the like so as to extend upwardly through a large opening 30 in frame plate 11 so as to mesh with bevel gear 32. Bevel gear 32 is rotatably mounted on a jack shaft 34 extending parallel to shafts 14 and 16 and extending between and journaled in the side webs 12 of the frame. The hub 33 of the bevel gear 32 has fixed thereto a drive gear 36 which meshes directly with the driven gear 38 of the number wheel 22 of lowest order of the quantity indicator 20. Drive gear 36 also meshes with a gear 40 loosely mounted on jack shaft 42. Jack shaft 42 is parallel to shaft 34 and extends between and is journaled in the side webs 12 of the frame. The hub 41 of the gear 40 has fixed thereto a cup-shaped gear 44 which meshes with the driven gear 38 of the number wheel 22 of lowest order of the quantity indicator 20A. As a result of this drive connection, the operation of the meter of the dispensing apparatus will cause the number wheels 22 of lowest order of the quantity indicators 20 and 20A to be rotated in opposite directions during a registering operation so that the numerals thereof are consecutively brought downwardly into the windows 26.

The cost indicators 18 and 18A are adapted to be driven by a bevel gear (not shown) which normally would be connected to a variable speed mechanism or so-called variator whereby it would be driven in selected timed relation to the meter shaft. The bevel gear driven by the variator shaft is adapted to extend upwardly through the large opening 30 and mesh with the bevel gear 46 which is fixed to the jack shaft 42 and, for convenience, is nested within the cup-shaped gear 44. The jack shaft 42 has a gear 48 fixed thereto at the left hand end as viewed in Fig. 2, which meshes directly with the driven gear 38 of the number wheel 22 of lowest order of the cost indicator 18A. The opposite end of the jack shaft 42 has fixed thereto a similar gear 50 which meshes with an idler gear 52 rotatably mounted on the jack shaft 34 which in turn meshes with the driven gear 38 of the number wheel 22 of lowest order of the cost indicator 18. It thus will be seen that rotation of the variator shaft will result in simultaneous rotation of the number wheels of lowest order of the cost indicators, the number wheels being turned in opposite directions so that the numerals thereof are consecutively brought downwardly into the windows 28. As will be apparent, the direction of rotation of the number wheels and the diagonal relationship of the corresponding indicators assures that the same readings will be obtained regardless of which end of the register is viewed.

Figure 6:
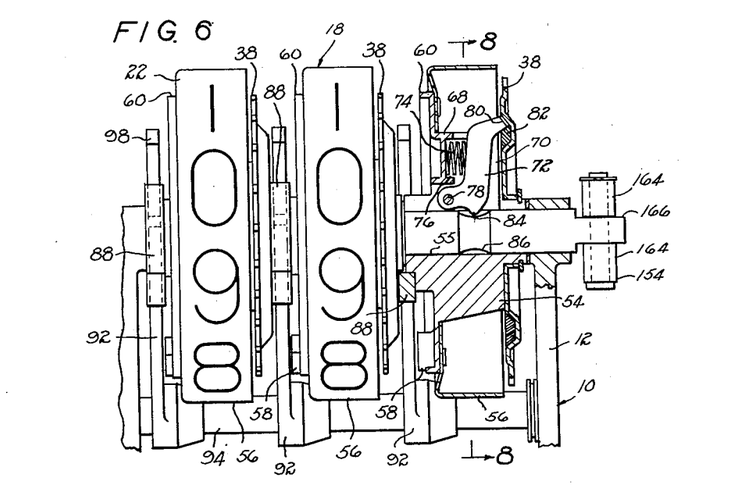
Fig. 6 is a fragmentary enlarged view, partially in cross section, of one of the indicators.
Figure 7:
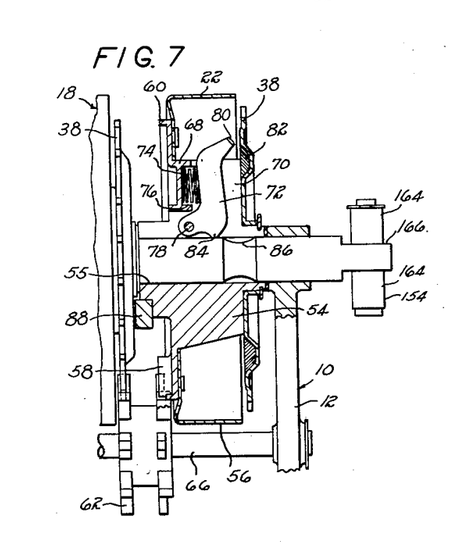
Fig. 7 is an enlarged fragmentary view, partially in cross section, of one of the number wheels with the supporting shaft in shifted position.
Figure 8:
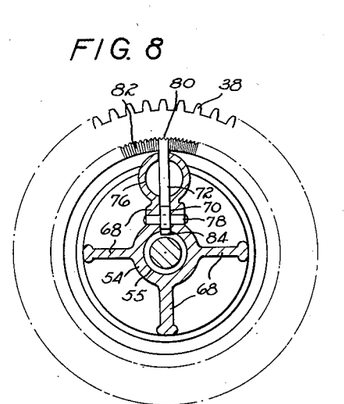
Fig. 8 is a cross sectional view taken along the line 8—8 of Fig. 6.

The rotation of the number wheels 22 of lowest order of each indicator is transferred to the wheels of higher order in a conventional manner. As is best shown in Figs. 6 and 7 of the drawings, each number wheel 22 consists of a hub 54 on which is mounted a cup-shaped drum 56. On the periphery of the drums 56 there appear the consecutive numerals 0 to 9, inclusive. Rotatably mounted on the hub 54 on one side of the drum 56 is the driven gear 38 previously mentioned. Fixed to the hub 54 and drum 56 on the opposite side of drum 56 is a two-toothed driving gear 58 and a locking disc 60 which are adapted to cooperate with a transfer pinion 62. The two teeth of the driving gear 58 are offset from the plane of the locking disc 60 and the locking disc 60 is provided with a notch 64 registering with the two teeth of the driving gear 58. The transfer pinions 62 are rotatably mounted between the wheels on supporting shafts 66 which are supported on the frame 10 so as to cooperate with the driving gear 58 and locking disc 60 of the number wheel of lower order and the driven gear 38 of the next adjacent number wheel of higher order. As is usual, the transfer pinions 62 are provided with alternate long and short teeth in which all of these teeth mesh with the driven gear 38 of the number wheel of higher order while only the long teeth are engaged by the driving gear 58 of the number wheel of lower order. The engagement of two teeth of the driving gear 58 of the number wheel of lower order with the transfer pinion occurs, of course, only while the wheel of lower order is turning from 9 to zero so as to advance the wheel of next higher order in stepwise fashion. Except during a transfer operation when the notch 64 of locking disc 60 is aligned with the transfer pinion, the long teeth of the transfer pinion 62 engage the periphery of the locking disc so as to prevent rotation of the transfer pinion and therefore the number wheel of higher order.

In order to disengage the number wheels from their respective driven gears 38 during a resetting operation, the supporting shafts 14 and 16 are shifted axially. As best shown in Figs. 6 and 7 of the drawings, the hub 54 of the number wheels includes a through bore 55 for accommodating the respective shafts 14 and 16 and each hub is provided with radiating webs 68, one of which is radially slotted as at 70 to accommodate a pivoted pawl 72. The pawl 72 is normally urged into cooperative engagement with its respective driven gear 38 by a compression spring 74, one end of which bears against the rear edge of the pawl and the other end of which is seated in a recess 76 at the rear of the slot 70. Each pawl is shown for illustrative purposes as being in the form of a flat piece pivoted at one end on a pin 78 extending across the radial slot 70, previously referred to, whereby the pawl is pivoted for swinging movement in a radial plane longitudinally of the axis of the wheel. The free or outer end of the pawl is provided on its extreme end with a number of fine V-shaped serrations or teeth 80 which are adapted to engage complementary teeth 82 provided on the associated driven gear 38. The arrangement of the teeth 82 is such as to form a complete internal frusto-conical band in the side face of the gear 38. The teeth 80 and 82 are complementary, i. e. of similar size, pitch and inclination so that they will properly intermesh.

When the pawls 72 are in the position illustrated in Fig. 6, the interengagement of the teeth on the pawl and the teeth on the driven gear causes the number wheel to rotate when the driven gear 38 is rotated. In this position it will be noted that each pawl has adjacent its pivoted end a lobe or projection 84 which extends into the bore of the hub 54 and which is received in a circumferential groove 86 in the supporting shaft 14 or 16, as the case may be. The circumferential grooves 86 freely accommodate these lobes so that the registering operations are not interfered with by the shafts. However, when the shafts 14 and 16 are shifted axially, the lobes 84 ride out of the grooves 86 and onto the cylindrical portions of the shafts which causes the pawls to be cammed out of engagement with the driven gears, as indicated in Fig. 7 of the drawings, whereby the number wheels are no longer connected to the driven gear 38 and thus are free to be reset.

In order to permit resetting of each of the number wheels 22 to initial starting position, there is provided a heart-shaped cam 88 secured to each of the hubs 54 adjacent the locking disc 60. For convenience, the heart-shaped cams 88 may be secured to the locking discs 60 such as by means of rivets 90. Cooperating with each heart-shaped cam 88 is a separate actuating or reset arm 92. The arms 92 are cooperating with the indicators 18 and 20 are fixed to a shaft 94 rotatably journaled at opposite ends of the frame, and the arms 92 cooperating with indicators 18A and 20A are fixed to a shaft 96 also journaled at opposite sides of the frame. The actuating arms 92 are provided with spaced apart fingers 98 which are adapted to engage against the periphery of the heart-shaped cam and thus turn the cam so that the point of the cam is farthest removed from the fingers 98 of the actuating arm 92. The cams 88 are fastened to the hubs of the number wheels, as previously mentioned, so that when the cams are fully turned or actuated by the arms 92, the indicia on the number wheels appearing in the windows 26 and 28 will be zero. The mode of operation of heart-shaped cams and associated actuating arms is, of course, well known in the art.

Figure 9:
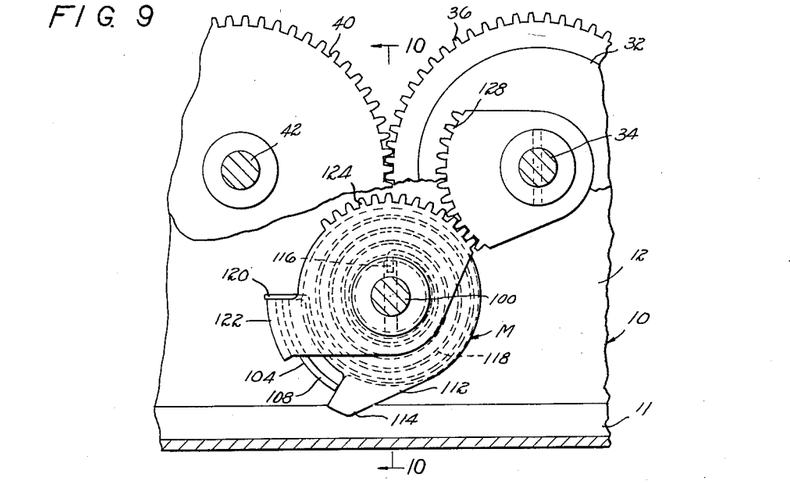
Fig. 9 is an enlarged fragmentary view of the lost motion connection disposed on the reset shaft.
Figures 10, 11:
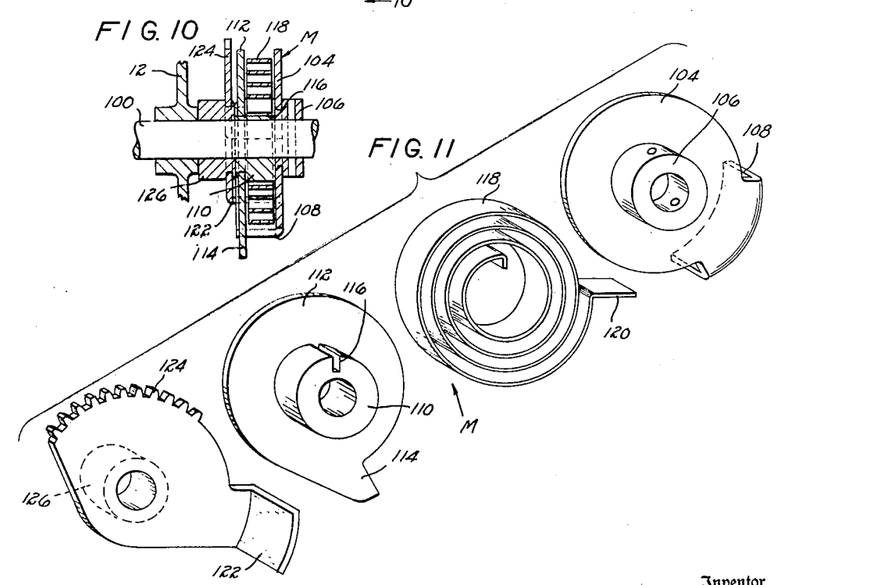
Fig. 10 is a cross sectional view taken along the line 10—10 of Fig. 9.
Fig. 11 is an exploded perspective view of the lost motion connection.

For driving the actuating arms 92 to carry out a resetting operation, there is provided a reset shaft 100 journaled in opposite side webs of the frame 10 near the midpoint of the frame and having on its outer end any suitable means for reciprocating the shaft, i. e. turning it through a partial revolution and return, such as the manually operated crank 102. Mounted on the reset shaft 100 is a lost motion connector generally designated by the reference letter M. The lost motion connector M, as best shown in Figs. 9, 10 and 11, comprises a first plate 104 having a hub 106 which is pinned to the reset shaft 100. The plate 104 is generally disc-shaped except for a projection 108 which is bent at right angles to the plane of the plate 104 and extends to the left as viewed in Fig. 10 of the drawings. To the left of the plate 104, as viewed in Fig. 10 of the drawings, there is a hub 110 which is loosely mounted on the shaft 100 and which has secured thereto a plate 112 having a radially extending shoulder 114. The hub 110 is notched at 116 to receive one end of a flat coil spring 118. The coil spring 118 is coiled in a clockwise direction as viewed in Fig. 9 of the drawings and at its outer end has a bent-over portion 120 extending radially outwardly so as to engage on the top of the projection 108 of the plate 104 and also a projection 122 on a gear segment 124 which is provided with a hub 126, also loosely mounted on the reset shaft 100. The projection 122 extends at right angles to the plane of the gear segment 124 and is disposed radially outwardly from the projection 108 of the first plate 104.

The operation of the lost motion connection M will probably be apparent from the foregoing description taken in connection with the following explanation. When the reset shaft is turned in a resetting direction, i. e. in a clockwise direction as viewed in Fig. 9 of the drawings, the projection 108 of the first plate 104, by engagement with the outer end of the coil spring 118, will cause rotation of the hub 110 and hence the plate 112. The spring 118 is sufficiently strong so that flexing of the spring will be negligible during normal operation of the apparatus. The rotation of the plate 112 in due course will bring the shoulder 114 thereof into contact with the projection 122, thus commencing rotation of the gear segment 124 to effect a resetting operation. When the crank is turned in the opposite direction to return the parts to original starting position, the first movement which occurs will be counterclockwise rotation of the first plate 104 whose projection 108 will engage against the shoulder 114 of the plate 112 and thus also impart rotation to the plate 112 and its hub 110. The hub 110 being connected to the spring 118 will cause the spring to be rotated as a body until the bent-over portion 120 engages against the projection 122 on the gear segment 124 and thus finally results in counterclockwise rotation of the gear segment 124. It thus will be apparent that during resetting, when the handle is turned first in a clockwise direction and also when it is reversed in a counterclockwise direction, there will be a time delay before motion is imparted to the gear segment 124.

The gear segment 124 meshes with a gear segment 128 which is fixed to the jack shaft 34 inwardly of the adjacent frame web 12. Also fixed to the jack shaft 34 at its outer end, projecting outwardly from the lefthand web 12, is a two-segment gear 130 which has a first segment 130a meshing with a gear segment 132 secured to the reset arm supporting shaft 94 in a manner to be described more particularly hereinafter. Gear 130 has a second segment 130b which segment portion 130b meshes with a two-segment gear 134 loosely mounted on the outer end of the jack shaft 42. Segment portion 134a, in turn, meshes with a gear segment 135 which is fixed to the reset arm carrying shaft 96. Accordingly, when the reset handle 102 and reset shaft 100 are turned in a clockwise direction to effect a resetting operation, the gear segment 132 will be turned in a clockwise direction and gear segment 135 will be turned in a counterclockwise direction, as viewed in Fig. 3 of the drawings.

Figure 3:
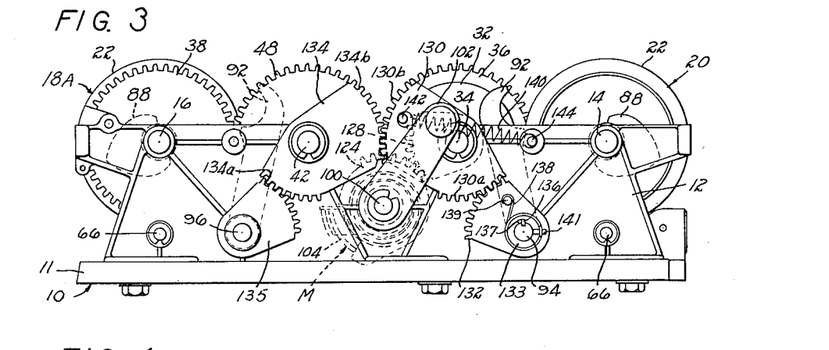
Fig. 3 is a side elevation of the mechanism as viewed from the left referring to Fig. 2.

The gear segment 135 is fixed to the shaft 96, as previously mentioned, so that the shaft 96 is positively driven at all times by the segment 135. The gear segment 132, however, is mounted on shaft 94 with provision for limited relative movement therebetween. Referring to Figs. 2 and 3 of the drawings, it will be seen that the gear segment 132 includes a hub 133 which is connected to the shaft 94 by means of a key 136 which extends into a keyway 137 in the shaft. The keyway is of larger size than the key so as to permit some play therebetween. A clearance or free movement of approximately five degrees is desirable. There is also provided a coil spring 138 extending around the hub 133 which is connected at one end to a stud 139 on the gear segment and which has its other end connected to a pin 141 in the end of shaft 94. As a result of the limited play between gear segment 132 and shaft 94, any misalignment of the number wheels on opposite ends of the register can be completely avoided. When assembling the register, the cam actuating arms 92, and particularly the arm cooperating with the quantity indicator wheel of lowest order, are fixed to the shaft 96 in such position that it is assured that the indicators 18 and 20 will be reset to zero slightly ahead of the indicators 18A and 20A. As a result, when the gear segments 132 and 134 are driven upon turning of the reset shaft, the gear segment 132 will cause the reset arm carrying shaft 96 to be turned through the coil spring 138, until indicators 18 and 20 are reset to zero whereupon further turning movement of shaft 96 will be prevented. However, gear segment 132 can continue to be advanced an additional slight amount by reason of the free play previously mentioned and the resiliency of spring 138. This additional permissive turning of the gear train thus insures that resetting of the indicators 18A and 20A will go to completion. In this way the necessity for accurately aligning or calibrating the resetting mechanism to insure exactly simultaneous resetting of the opposite sets of number wheels, which is almost impossible to attain in commercial production, may be avoided.

As previously mentioned, lost motion connection M is provided so that the reset shaft 100 may be turned a limited degree before movement is imparted to the various gear segments, both when reset is initiated and when the reset shaft is turned in a reverse direction to return the mechanism to original starting position. This is important because it insures that the number wheels will be fully unlocked before zeroizing of the number wheels is initiated, and that subsequently they will be relocked to the driving mechanism before the arms 92 which zeroize the number wheels are removed from engagement with the cams 88. The latter feature is essential to accurate calibration, for otherwise slight movement of the number wheels, particularly those of lowest order, might occur. Therefore, to insure that there will be no movement of the gear segments upon turning of the reset handle until the desired advance turning of the reset shaft 100 has been accomplished, there is provided a spring 140 connected at one end on a stud 142 on the outer face of the segment gear 130 and at the other end to a stud 144 on the web of the frame 10. The studs 142 and 144 are so located that the spring 140 operates, in effect, like a toggle, i. e. the axis of the spring 140 will extend on one side of the center of the jack 34 at the initiation of reset and on the other side at completion of reset so as to hold the gear segment 128 from turning until it is positively driven through the lost motion connection M previously described.

Figure 4:
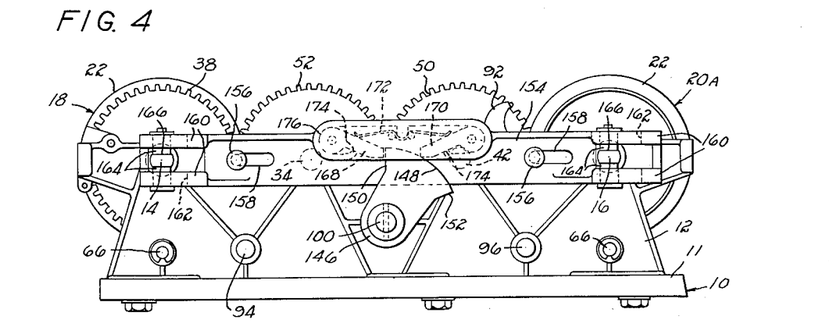
Fig. 4 is a side elevation of the mechanism as viewed from the right referring to Fig. 2.
Figure 5:
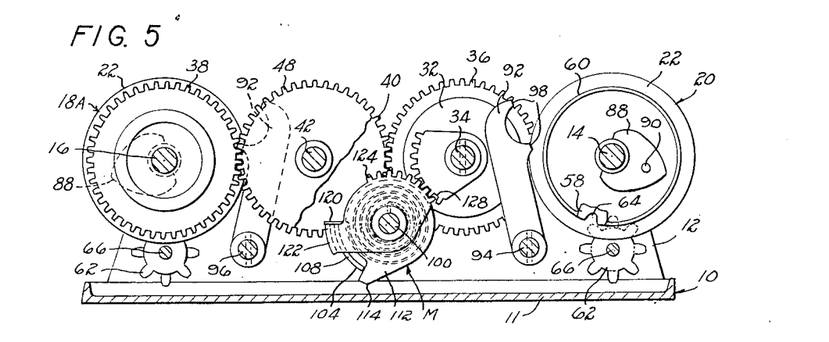
Fig. 5 is a cross sectional view taken along the line 5—5 of Fig. 2.

Fixed to the reset shaft 100 at the opposite end from the crank 102 there is fastened a cam 146, in the form as best shown in Fig. 4 of the drawings. The cam 146 is provided with an arcuate outer edge 148 terminating in radial shoulders 150 and 152 at opposite sides thereof. The cam 146 is provided for the purpose of actuating a slide 154 which in turn will actually reciprocate the shafts 14 and 16 on which the number wheels are positioned. As best shown in Fig. 4 of the drawings, the slide 154 is an elongated plate which is slidably supported by studs 156 on the adjacent web of the frame 10 and which studs extend through elongated slots 158 in the slide 154. As best shown in Figs. 2 and 4 of the drawings, the outer extremities of the slide 154 are bent over to provide horizontal wings 160 in which are cut diagonal slots 162, as best shown in Fig. 2. The diagonal slots 162 receive rollers 164 which are fastened to the outside of the shafts 14 and 16, these shafts being flattened as shown at 166 to facilitate the mounting of the rollers 164. As a result of the pin and slot connection just described, it will be apparent that when the slide 154 is moved to the left, as viewed in Fig. 4, the shafts 14 and 16 will be pulled outwardly, i. e. to the right as viewed in Fig. 2. Due to the shape of the slots 162, the slide, when moved to the left as just described, will tend to remain in that position until positively actuated in a reverse direction. When the slide is moved in a reverse direction, i. e., to the right as viewed in Fig. 4, the shafts 14 and 16 will be pushed inwardly, i. e. to the left as viewed in Fig. 2. As previously described, the shifting of the shafts to the right as viewed in Fig. 2 will disengage the number wheels from their respective driven gears and when the shafts are returned to original position, the number wheels are re-engaged with their respective driven gears.

As best shown in Fig. 4 of the drawings, the slide 154 has mounted thereon a pair of pivoted pawls 168 and 170, these pawls being urged in opposite directions by means of a spring 172 extending therebetween; the pawl 168 being urged in a clockwise direction and the pawl 170 being urged in a counterclockwise direction. Rotation of the pawls 168 and 170 is limited by means of stops 174 formed at the edges of a cage 176 enclosing the pawls 168 and 170.

In the normal position of the mechanism, i. e. during registering, the cam 146 extends upwardly between the outer ends of the pawls 168 and 170, as shown in Fig. 4 of the drawings. Then, when the cam 146 is rotated in a counterclockwise direction, as viewed in Fig. 4, which occurs at the initiation of a reset operation, the shoulder 150 by engagement against the nose of the pawl 168 will move the slide 154 in a lefthand direction. This movement continues until the shifting of the shafts 14 and 16 has been completed, whereupon the arcuate outer edge 148 of the cam 146 will ride underneath the pawl 168 so that further turning movement of the reset shaft 100 will not be prevented. Due to the lost motion connection M previously described, the shifting of the slide 154 takes place before the resetting pawls 92 are actuated, thus insuring that no attempt will be made to reset the number wheels until they have been fully disengaged from their respective driving gears. At the completion of the reset, when desired to turn the reset shaft 100 in a reverse direction to original starting position, the first operation which takes place will be the clockwise rotation of the cam 146, as viewed in Fig. 4, causing the shoulder 152 to engage against the nose of the pawl 170, thus returning the slide to initial starting position. Here again the movement of the slide takes place before any movement is imparted to the reset arms 92, thus insuring that the number wheels will be re-engaged with their driving gears and thus locked in zero position before the reset pawls release the number wheels. In that way inaccurate resetting of the number wheels during a zeroizing operation is completely avoided.

In the operation of the resetting mechanism it is possible that one of the reset pawls 92 may engage against a point on one of the heart-shaped cams 88 whereby resetting is prevented. It has been found that this situation will arise only rarely but, if such engagement should occur with the present mechanism, no damage will result because of the spring 118 in the lost motion connector M. While this spring is stiff enough so that it normally will not flex during a resetting operation, nonetheless if movement of one of the pawls is prevented, the spring 118 will give sufficiently to prevent breakage. In the event resetting is not accomplished for the reasons just set forth, the operator need only return the reset mechanism to initial starting position and then again go through the resetting operation. It has been found that the exact position of the wheels which will cause one of the reset arms to be blocked by the point of a heart-shaped cam 88 is so critical that the slight amount of vibration required to return the reset mechanism to initial starting position and then the repetition of the resetting operation will generally overcome the situation and permit resetting to be carried out to completion.

It thus will be seen that there has been provided in accordance with the invention a register or counter having a resetting arrangement operating on the heart-shaped cam principle which is compact and highly efficient in operation and which will function effectively and reliably for the intended purpose.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In a counter, a plurality of number wheels, including a driving and a driven gear associated with each wheel and arranged in side by side relationship therewith, interrupted toothed gearing between the driving and driven gears for connecting the number wheels in driving relationship whereby the number wheel of higher order is driven from the preceding number wheel of lower order, a heart-shaped cam secured to each number wheel, a resetting arm engageable with each heart-shaped cam to reset the number wheels, and means normally connecting the number wheels to their respective driving gears in positive driving relationship which is shiftable to free the number wheels from the driving gears during a resetting operation.

2. In a counter, an axially shiftable supporting shaft, a plurality of number wheels, including a driving and a driven gear associated with each wheel and arranged in side by side relationship therewith, on the shaft, interrupted toothed gearing between the driving and driven gears for connecting the number wheels in driving relationship whereby the number wheel of higher order is driven from the preceding number wheel of lower order, displaceable means for selectively connecting and disconnecting the number wheels and their respective driving gears, means for displacing said displaceable means to disconnecting position when the shaft is axially shifted to place the number wheels in condition for zeroizing, a heart-shaped cam secured to each number wheel, and a resetting arm engageable with each heart-shaped cam to zeroize the number wheels.

3. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, displaceable means for selectively connecting and disconnecting the number wheels and their respective driving gears, means for displacing said displaceable means to disconnecting position when the shaft is axially shifted to place the number wheels in condition for zeroizing, a heart-shaped cam secured to each number wheel, resetting arms engageable with the heart-shaped cams to zeroize the number wheels, and common actuating means for operating the resetting arms and for shifting the shaft to zeroize the number wheels.

4. In a counter, an axially shiftable supporting shaft, a plurality of number wheels on the shaft, means for driving the number wheels during a counting operation including a driven member associated with each number wheel, a driving pawl pivoted to each wheel for swinging movement into and out of driving engagement with the respective driven member, means on the shaft for disengaging the pawl when the shaft is shifted in one direction, a heart-shaped cam on each number wheel, resetting arms engageable with the heart-shaped cams to zeroize the number wheels, means for shifting the supporting shaft, means for actuating the resetting arms and means for operating the last two named means in sequence.

5. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, a driving pawl pivoted to each wheel for swinging movement into and out of driving engagement with the respective driving gear, means on the shaft for positioning the pawl in accordance with the shifted position of the shaft, a heart-shaped cam secured to each number wheel, resetting arms engageable with the heart-shaped cams to zeroize the number wheels, and means for shifting the shaft and actuating the resetting arms in sequence.

6. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, displaceable means for selectively connecting and disconnecting the number wheels and their respective driving gears, means for displacing said displaceable means to disconnecting position when the shaft is axially shifted to place the number wheels in condition for zeroizing, a heart-shaped cam secured to each number wheel, resetting arms engageable with the heart-shaped cams to zeroize the number wheels, and means for shifting the shaft and actuating the resetting arms in timed sequence to effect a resetting operation.

7. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, displaceable means for selectively connecting and disconnecting the number wheels and their respective driving gears, means for actuating said displaceable means when the shaft is axially shifted, a heart-shaped cam secured to each number wheel, resetting arms engageable with the heart-shaped cams to zeroize the number wheels, reciprocal actuating means for resetting the counter, a connection between the actuating means and the supporting shaft for shifting upon operation of the actuating means, and a lost motion connection between the actuating means and the resetting arms whereby the arms are reciprocated following shifting of the supporting shaft.

8. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, displaceable means for selectively connecting and disconnecting the number wheels and their respective driving gears, means for actuating said displaceable means when the supporting shaft is axially shifted, a heart-shaped cam secured to each number wheel, resetting arms engageable with the heart-shaped cams to zeroize the number wheels, a reset shaft, means for reciprocally rotating the reset shaft, means for shifting the supporting shaft, a driving connection between the last-named means and the reset shaft, means for actuating the resetting arms, a lost motion connection between the last-named means and the reset shaft, and biasing means for holding the reset arms in position until driven by the said lost motion connection.

9. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, displaceable means for selectively connecting and disconnecting the number wheels and their respective driving gears, means for actuating said displaceable means when the supporting shaft is axially shifted, a heart-shaped cam secured to each number wheel, an auxiliary shaft extending generally parallel to the number wheel supporting shaft, a plurality of resetting arms supported on the auxiliary shaft and shiftable into and out of engagement with the heart-shaped cams when the auxiliary shaft is reciprocally rotated, a reset shaft, means operable by the reset shaft for shifting the supporting shaft, and a lost motion connection between the reset shaft and the auxiliary shaft.

10. In a counter, an axially shiftable supporting shaft, a plurality of number wheels on the shaft, interrupted toothed gearing and complementary driving gears for connecting the number wheels in driving relationship whereby the number wheel of higher order is driven from the preceding number wheel of lower order, displaceable means for selectively connecting and disconnecting the number wheels and their respective driving gears, a means for actuating said displaceable means when the supporting shaft is axially shifted, a heart-shaped cam secured to each number wheel, an auxiliary shaft extending generally parallel to the number wheel supporting shaft, a plurality of resetting arms supported on the auxiliary shaft and shiftable into and out of engagement with the heart-shaped cams when the auxiliary shaft is reciprocally rotated, a reset shaft, means including a cam on the reset shaft for shifting the supporting shaft, and a resilient lost motion connection between the reset shaft and the auxiliary shaft comprising a driving element fixed to the reset shaft and rotatable therewith, a driven element operably connected to the auxiliary shaft and rotatably mounted adjacent the driving element, said elements being provided with opposing transverse projections, a rotatable transfer element intermediate the driving and driven elements having a shoulder engageable with one side of said projections, and a coil spring fixed at one end to the transfer element having an extension for engaging the other side of said projections.

11. In a counter, a plurality of number wheels, a heart shaped cam secured to each number wheel, a plurality of resetting arms shiftable into engagement with the peripheries of the cams to zeroize the number wheels, a reciprocal actuating element, and a resilient connection between the actuating element and the resetting arms.

12. In a counter, a plurality of coaxially mounted number wheels, a heart shaped cam secured to each number wheel, a first shaft extending generally parallel to the axis of the number wheels, resetting arms secured to the first shaft for swinging movement into and out of engagement with the cams when the first shaft is reciprocally rotated, a reset shaft, and a resilient driving connection between the reset shaft and the first shaft.

13. In a counter, a plurality of coaxially mounted number wheels, a heart shaped cam secured to each number wheel, a first shaft extending generally parallel to the axis of the number wheels, resetting arms secured to the first shaft for swinging movement into and out of engagement with the cams when the first shaft is reciprocally rotated, a reset shaft, and a resilient lost motion connection between the reset shaft and the first shaft.

14. In a counter, a plurality of coaxially mounted number wheels, a heart shaped cam secured to each number wheel, a first shaft extending generally parallel to the axis of the number wheels, resetting arms secured to the first shaft for swinging movement into and out of engagement with the cams when the first shaft is reciprocally rotated, a reset shaft, and a resilient lost motion connection between the reset shaft and the first shaft comprising a driving element fixed to the reset shaft and rotatable therewith, a driven element operably connected to the first shaft and rotatably mounted adjacent the driving element, said elements being provided with opposing transverse projections, a rotatable transfer element intermediate the driving and driven elements having a shoulder engageable with one side of said projections, and a coil spring fixed at one end to the transfer element having an extension for engaging the other side of said projections.

15. In a counter, a frame, a pair of parallel supporting shafts mounted for axial movement on the frame, an indicator on each shaft comprising a plurality of side by side number wheels, interrupted toothed gearing and complementary driving gears for connecting the number wheels of each indicator in driving relationship whereby the number wheels of higher order are driven from the preceding number wheels of lower order, displaceable means for selectively connecting and disconnecting the number wheels and their respective driving gears, means for displacing the displaceable means when the supporting shafts are axially shifted, a heart shaped cam secured to each number wheel, resetting arms mounted for swinging movement into engagement with the heart shaped cams to reset the number wheels to zero, operating means to drive the resetting arms into engagement with the cams, a slide mounted for sliding movement transversely of the supporting shafts and having means for axially shifting the supporting shafts when the slide is shifted, and means for actuating the slide and the resetting arms operating means in timed sequence.

16. In a counter, a frame, a pair of parallel supporting shafts mounted for axial movement on the frame, an indicator on each shaft comprising a plurality of side by side number wheels, interrupted toothed gearing and complementary driving gears for connecting the number wheels of each indicator in driving relationship whereby the number wheels of higher order are driven from the preceding number wheels of lower order, displaceable means for selectively connecting and disconnecting the number wheels and their respective driving gears, means for displacing the displaceable means when the supporting shafts are axially shifted, a heart shaped cam secured to each number wheel, resetting arms engageable with the cams to reset the number wheels, a reset shaft for actuating the resetting arms, a slide mounted on the frame for sliding movement transversely of the supporting shafts and having means for shifting the supporting shafts when the slide is shifted, a cam on the shaft having opposed radially extending shoulders, and a pair of spaced apart pivotally mounted pawls on the slide engageable alternately with said shoulders.

17. In a resettable counter, a frame, a pair of parallel supporting shafts mounted for axial movement on the frame, an indicator on each shaft comprising a plurality of side by side number wheels, means for driving the number wheels during a counting operation including a driven member associated with each number wheel, displaceable means for selectively connecting and disconnecting the number wheels and their respective driving gears, means for displacing the displaceable member when the supporting shafts are axially shifted, a slide mounted on the frame for sliding movement transversely of the supporting shafts and having means for axially shifting the supporting shafts when the slide is shifted, a reset shaft, a cam on the shaft having opposed radially extending shoulders, and a pair of spaced apart pivotally mounted pawls on the slide engageable alternately with said shoulders.

18. In a resettable counter, a frame, a pair of parallel indicator supporting shafts mounted for axial movement on the frame, a slide mounted for sliding movement on the frame transversely of the shafts, means on the slide for axially shifting the shafts when the slide is shifted, a rotatable reset shaft extending transversely of the slide, and means for actuating the slide during initial turning of the shaft in either direction comprising a radially extending plate on the reset shaft having spaced apart radially extending shoulders, a pair of pawls pivotally mounted on the slide for engagement respectively with said radial shoulders, means biasing the pawls into engaging position, and means limiting pivoting movement of the pawls.

19. In a counter, a pair of supporting shafts, an indicator on each shaft comprising a plurality of side by side number wheels, a heart-shaped cam secured to each number wheel, a pair of rotatable auxiliary shafts parallel, respectively, to said supporting shafts, a plurality of resetting arms secured to each auxiliary shaft and engageable with said cams to reset the number wheels when the auxiliary shafts are turned, a reset shaft, gear trains between the reset shaft and each of said auxiliary shafts, and a resilient lost motion connection in at least one of said gear trains to insure full resetting movement of said auxiliary shafts.

HAROLD B. VROOM.

REFERENCES CITED

The following references are of record in the file of this patent:

UNITED STATES PATENTS

| Number | Name | Date |
| --- | --- | --- |
| 2,193,320 | Hoyle et al. | Mar. 12, 1940 |
| 2,563,668 | Abel | Aug. 7, 1951 |